Jan. 26, 1926.                                          1,570,724
F. BECK
AUTOMATIC CHUCK
Filed Nov. 9, 1921                 4 Sheets-Sheet 1

Inventor:
F. Beck
By Lawrence Languer
Attorney

Jan. 26, 1926.　　　　　　　　　　　　　　　1,570,724
F. BECK
AUTOMATIC CHUCK
Filed Nov. 9, 1921　　　　4 Sheets-Sheet 3

Inventor:
F. Beck
By Lawrence Langner
Attorney

Jan. 26, 1926.  1,570,724
F. BECK
AUTOMATIC CHUCK
Filed Nov. 9, 1921  4 Sheets-Sheet 4
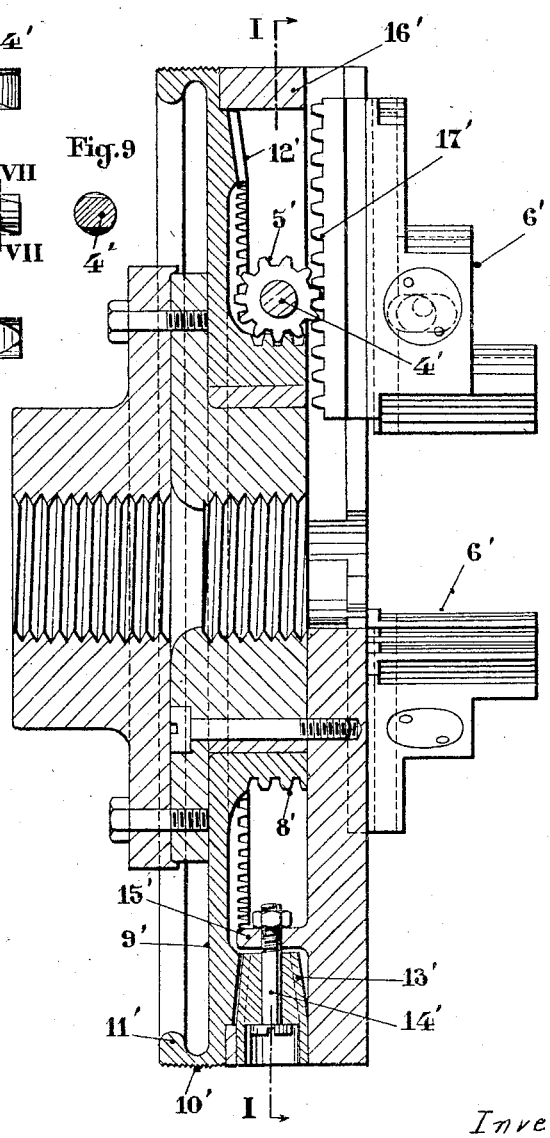
Inventor:
F. Beck
By Lawrence Langner
Attorney Patented Jan. 26, 1926.

1,570,724

UNITED STATES PATENT OFFICE.

FRÉDÉRIC BECK, OF NEUILLY-SUR-SEINE, FRANCE.

AUTOMATIC CHUCK.

Application filed November 9, 1921. Serial No. 514,025.

*To all whom it may concern:*

Be it known that I, FRÉDÉRIC BECK, a citizen of the French Republic, residing at Neuilly-sur-Seine, Seine, France, 46 Rue Ibry, have invented new and useful Improvements in Automatic Chucks, which are fully set forth in the following specification.

This invention relates to an automatic chuck intended to hold a working tool or any material to be worked upon in a lathe or similar machine, and in which the clamping-gear causes equal and simultaneous radial movements of the clamping dogs.

This movement, which has been realized in other devices of the same kind, is obtained, in the chuck according to this invention, by means of mechanical arrangements, in which are used certain elements known in the art, but which are combined with each other so as to insure an automatic centering of the object clamped relatively to the axis of the chuck, together with the tightening thereof.

Said chuck is simpler in construction than the analogous devices heretofore in use, owing to the fact that its elements are easily manufactured even with very restricted manufacturing facilities.

Two practical embodiments of the invention are illustrated, by way of examples, in the accompanying diagrammatic drawings, in which:

Fig. 4 is a longitudinal section on line II—II of Fig. 3;

Figs. 5, 6, 7, 8 and 9 show respectively, a side elevation, a plan view from above, a plan view from below, a lateral elevation and a transversal section on line VII—VII (Figure 5) of one of the axes of the toothed pinions actuating the clamping dogs.

Fig. 10 is a sectional view showing the pinion mounting.

Figure 1:
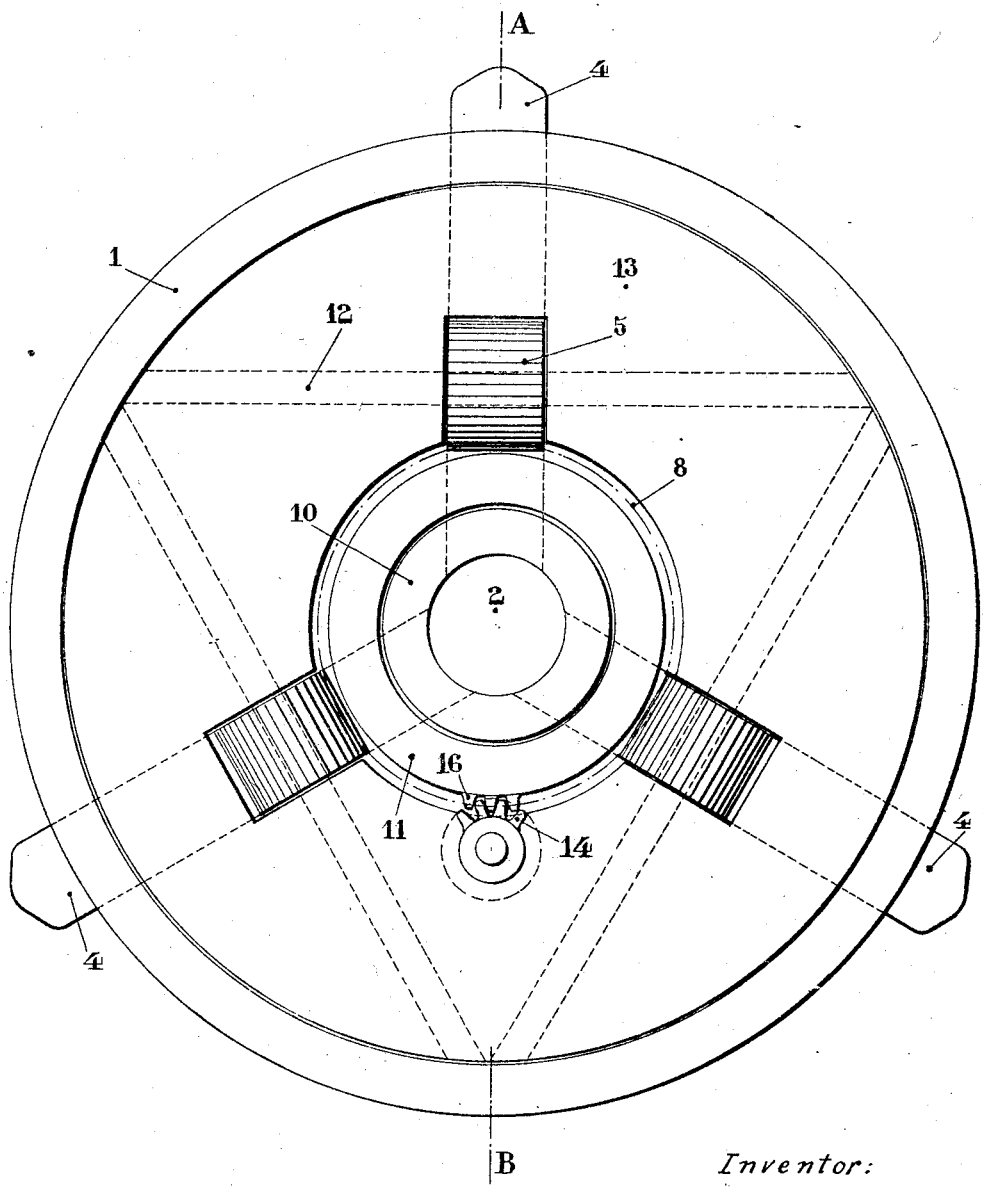
Fig. 1 is a rear elevation, with parts removed.
Figure 2:
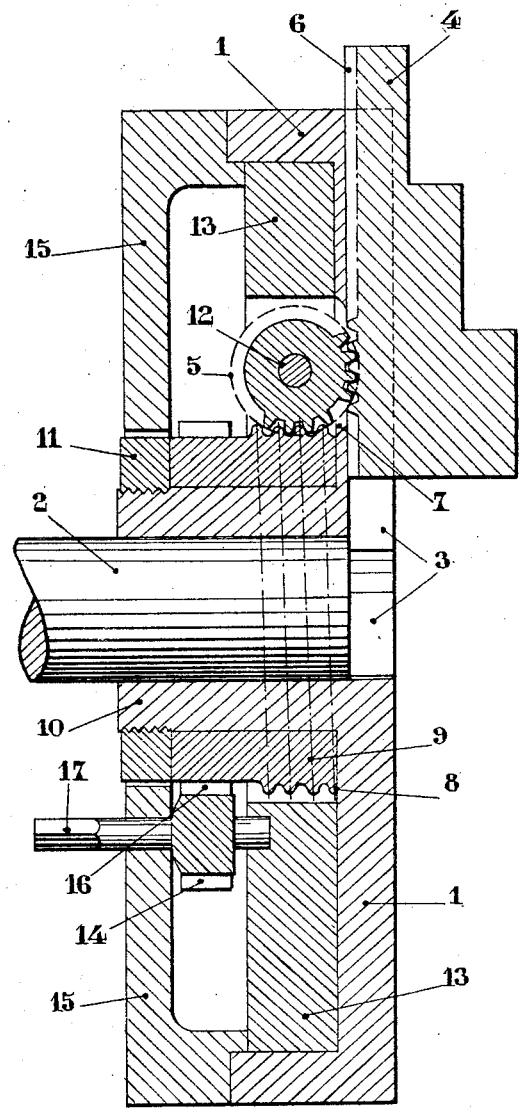
Fig. 2 is a longitudinal section on line A—B of Fig. 1.

In the structural form according to Figures 1 and 2, a disc 1, fastened, in the usual manner, upon the spindle 2 of the machine, is provided with radial grooves 3, in which can slide clamping dogs 4. Said grooves and dogs comprise any suitable guiding device allowing only movements of rectilinear translation of each dog along its groove.

The movement of each of the dogs, is obtained by means of a toothed pinion 5 acting upon the teeth of the rack 6 forming part of the inner face of the adjacent dog 4. The actuation of the rack by the pinion takes place through an aperture 7 provided in the disc 1.

This arrangement enables the same dogs to be used, whatever be the direction of their action (inwardly or outwardly), for it is sufficient to reverse them end for end in order that their steps be properly turned in view of their desired action.

The toothed pinions are in turn, put into motion by means of a screw element 8 rotating around the axis of the chuck and meshing with said pinions.

As the pinions 5, corresponding to the dogs 4, all intermesh simultaneously with the screw element 8, to each movement of the latter will correspond simultaneous and equal movements of the dogs 4, whatever be the number of said dogs and their relative angular positions around the disc 1.

The screw element 8 is formed upon a part 9 which rotates concentrically with the axis of the chuck around the sleeve 10 of the disc 1. This sleeve 10 may be integral with or separate from said disc, provided that it be secured thereto in a rigid manner.

The part 9 which rotates around the sleeve 10 must not be capable of longitudinal movement on the axis of rotation. To prevent longitudinal movements and to take up any longitudinal play any suitable means may be employed, for instance, as shown in Figure 2, where a tightening nut 11 is employed.

The toothed pinions 5 rotate around axles 12 which are rigidly connected with the disc 1. This connection may be realized in any suitable manner, such as, for instance, shown in Figure 2 (in order to enable an easy dismantling of the whole) by fastening them into an auxiliary circular part 13, which is itself rigidly connected with the disc 1.

Rotation around its axis may be given to the part 9 bearing the screw element 8 in any manner suited to the particular conditions of use of the chuck.

Said rotation may be realized, for instance, as shown in Figures 1 and 2, by the action of a small toothed pinion 14 (the axis of which is supported by the auxiliary part 13 and by the rear disc 15 covering the mechanism of the chuck) upon a toothed crown 16 integral with or rigidly connected to the part 9.

The pinion 14 may be rotated by means of a spanner acting upon the squared end of the pinion.

The actuation might also be obtained by means of a greater number of pinions 14 acting upon a single toothed crown 16, assuming that their simultaneous action be controlled by any suitable device.

In the example of construction of the chuck illustrated by Figures 1 and 2, the divided pitch $p$ of the multiple thread screw element 8 is equal to the pitch of the pinion 5 and, consequently, to that of the rack 6.

According to this invention, to facilitate the assemblage of the chuck, the screw 8, the pinions 5, and the racks 6 are so chosen as to make the dogs 4 mutually interchangeable as well as reversible end for end. To accomplish this, screw 8 is furnished with a multiple thread, the true pitch of which is equal to the pitch of the pinions 5 times an integer which is equal to, or a multiple of, the number of pinions used; while the number of threads on the multiple screw 8 is equal to said integer.

For example, in the case illustrated, the number of pinions 5, is three, and thus the screw 8 has a triple thread, the divided pitch of which is equal to the pitch of the pinions 5, and the true pitch of which is three times the pitch of pinions 5.

With this construction the relative positions of the pinions 5 remain unchanged during operation, and so permit the use of any dog 4, with any pinion 5.

Under such conditions, the dogs are interchangeable and the assemblage of the chuck becomes very simple and rapid since there is no need of ascertaining which of the racks intermeshes with each of the pinions.

Figures 3 to 9 illustrate an improved structural form of a chuck according to the invention, comprising two improvements the one of which enables the simplifying of the construction of the apparatus, and the other the acceleration of the clamping of the material to be worked upon or of the working tool by the dogs.

The first improvement relates merely to a detail of construction which is, however, important as far as quantity production is concerned, and has been suggested by the following considerations:

In the form of the chuck shown in Figs. 1 and 2, the axes of the pinions actuating the dogs are shaped as complete cylinders, the ends of which are supported in the interior of rectilinear grooves which must be cut by a milling machine, when the chuck body has been previously turned in a lathe. Besides that the cost of the workmanship, is increased by this subsequent milling operation, and is pretty difficult, because it requires sufficient skill and special care in order that, all the grooves be located accurately at the same distance from the center.

Figure 3:
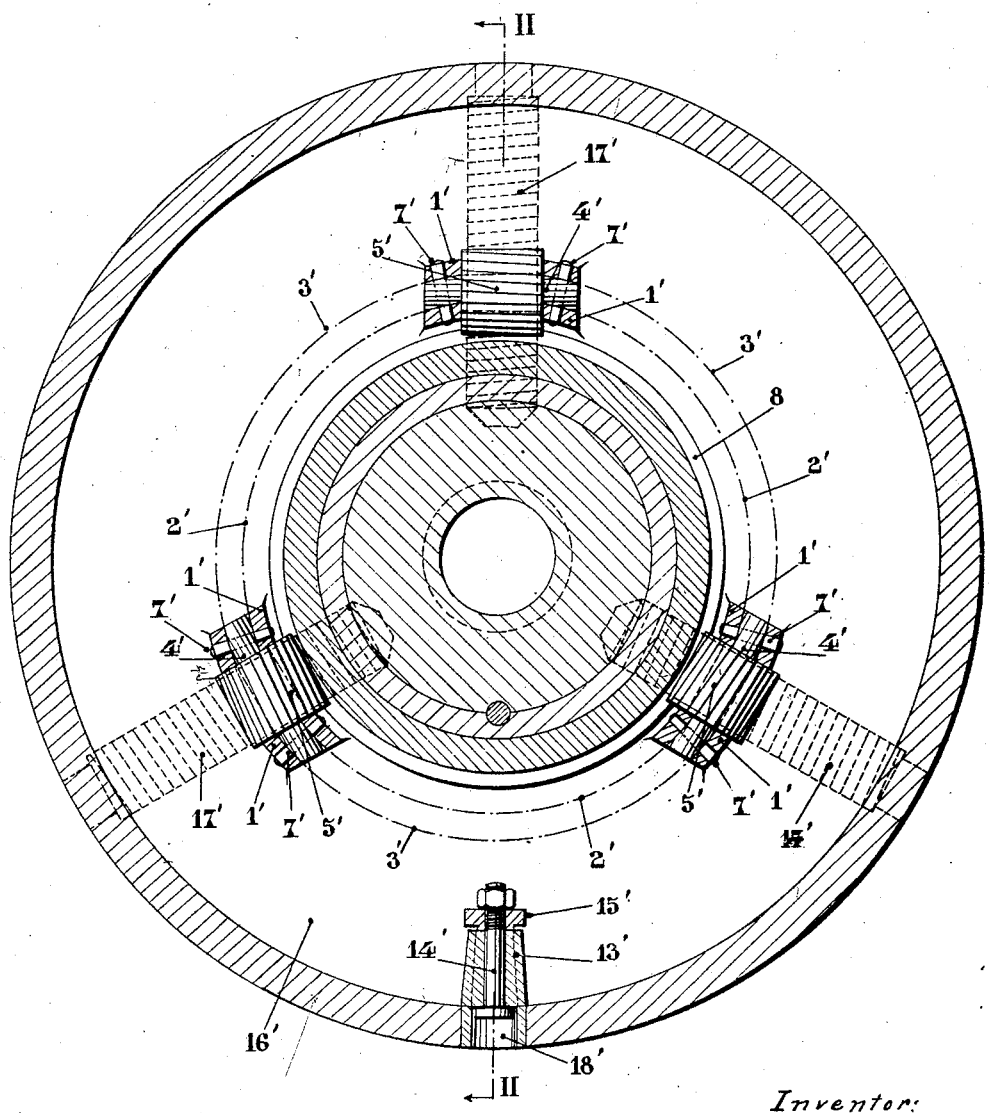
Fig. 3 is a transverse section on line I—I of Fig. 4.

Said milling operation may be dispensed with by substituting for these rectilinear grooves, arcuate grooves limited by two cylindrical surfaces, as shown in Fig. 3, the axes of which coincide with the axis of the chuck, which grooves may be cut in brackets 1' in plate 16', by the lathe tool itself working endwise between the two circumferences 2' and 3'.

To the ends of each of the axes 4' of the pinions 5' for actuating the dogs 6' is given, in this case, an arcuate shape (Figures 5 to 9) identical with that of the grooves in which they are housed.

In other words, the axis 4' consists of a cylindrical mass of metal, steel for instance, from which are cut off, with a file or a milling tool, all the parts comprised between the outline drawn in full lines and the rectangle shown in pick-and-dot lines on Figure 5, care being taken to accurately fit the ends of the axis 4' into the arcuate grooves in such a manner that they engage the said grooves without any play, wherein they are afterwards fastened by means of pins 7'.

The second improvement relates to a device intended to accelerate the clamping by enabling the dogs 6' to be moved simultaneously and very quickly towards or away from each other, by means of a square ended T-spanner, engaging the socket in a bevel pinion meshing with the toothed crown provided on the central screw element actuating the dogs through the medium of their pinions.

Said improvement consists in having cast with, or fastened to, a screw element 8' (Figure 4) a disc 9', the milled periphery 10' of which is provided externally with a rounded projecting flange 11' adapted to be easily grasped by the hand, and provided internally with a bevel toothed crown 12' meshing with a correspondingly beveled pinion 13' mounted loosely upon a spindle 14' supported by a bracket 15' integral with the disc 16'.

For quickly bringing the dogs 6' into contact with the material or the working tool to be clamped by the chuck, it suffices to rotate the disc 9' in order to move the screw element 8' in the proper direction, the rotation of which is transformed by the pinions 5' and the racks 17' into a simultaneous radial translation of the dogs 6'. The final tightening, as intensive as it is desirable, is given by rotating in the proper direction, by means of a square-ended T-spanner inserted into the socket 18′, the conical pinion 13′, and, consequently the disc 9′ and the screw element 8′.

The feature of interchangeability of the clamping dogs is provided for in this case in exactly the same manner as set forth above with regard to Figures 1 and 2.

For loosening, the reverse operations are performed.

The above described improvements are equally applicable to chucks provided with four, or more, clamping dogs, which may be either ordinary dogs, or, as shown in Figures 3 and 4, dogs with adjustable jaws.

I now claim:

1. An automatic chuck comprising a plate, clamping dogs positioned on said plate, pinions for operating said dogs, means for operating said pinions, an annular groove in the plate, the pinions being carried by axes so shaped as to fit snugly into, and to completely fill the portions of the said annular groove occupied by the free ends of said axes.

2. An automatic chuck comprising a plate, clamping dogs associated with said plate, racks on the dogs, pinions for meshing with the racks formed on said dogs, said pinions being positioned in slots intersecting an annular channel in said plate and being carried by axes so formed as to snugly fit into said channel, and means for operating said pinions.

3. An automatic chuck, comprising, a plate, clamping dogs slidably positioned in the plate, pinions for operating the dogs, an endless screw for operating the pinions, said endless screw having a multiple thread equal in number to the number of pinions in the chuck, the divided pitch of which is equal to the pitch of the pinions, and the true pitch of which is equal to the divided pitch times the number of pinions in the chuck, so that the relative position of the pinions remain unchanged during operation of the chuck, whereby to make the dogs mutually interchangeable.

4. An automatic chuck, comprising, a plate, clamping dogs slidably positioned in the plate, pinions for operating the dogs, an endless screw for operating the pinions, said endless screw having a multiple thread equal in number to an integer equal to or a multiple of the number of pinions in the chuck, the divided pitch of which is equal to the pitch of the pinions and the true pitch of which is equal to the divided pitch times the said integer, so that the relative position of the pinions remain unchanged during operation of the chuck, whereby to make the dogs mutually interchangeable.

In testimony whereof I have signed this specification.

FRÉDÉRIC BECK.